Dec. 21, 1937.  H. C. WOODHEAD  2,102,775
AUTOMOBILE GAS TANK CAP LOCK
Filed Jan. 19, 1937  2 Sheets-Sheet 2
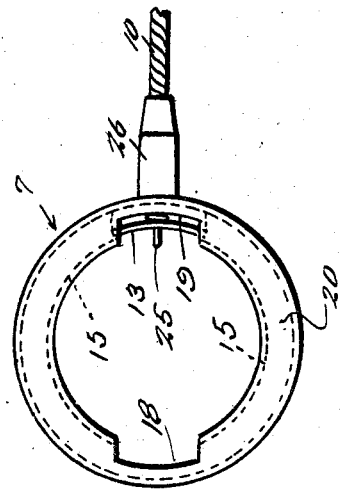
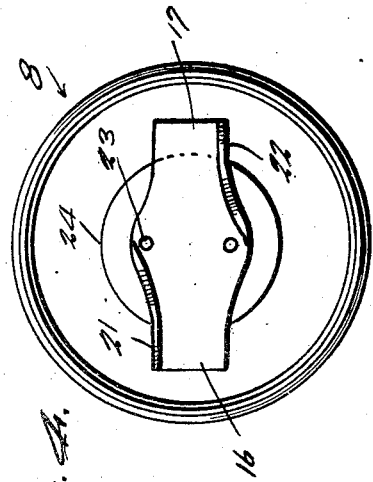
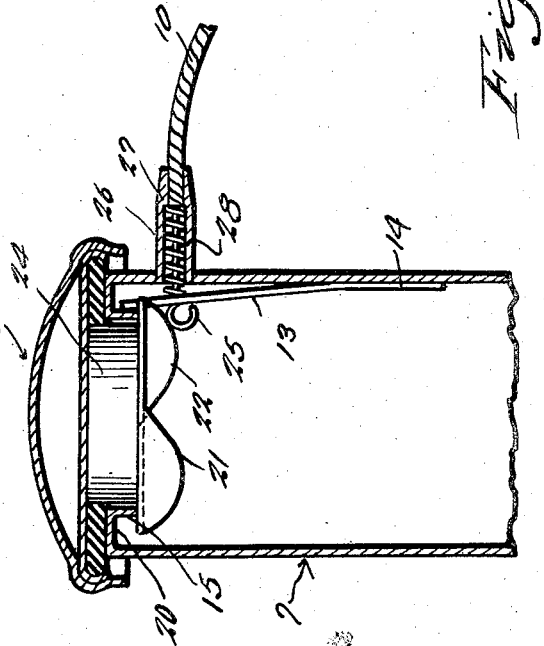
Inventor
Hannah C. Woodhead
By Clarence A. O'Brien
Hyman Berman
Attorneys Patented Dec. 21, 1937

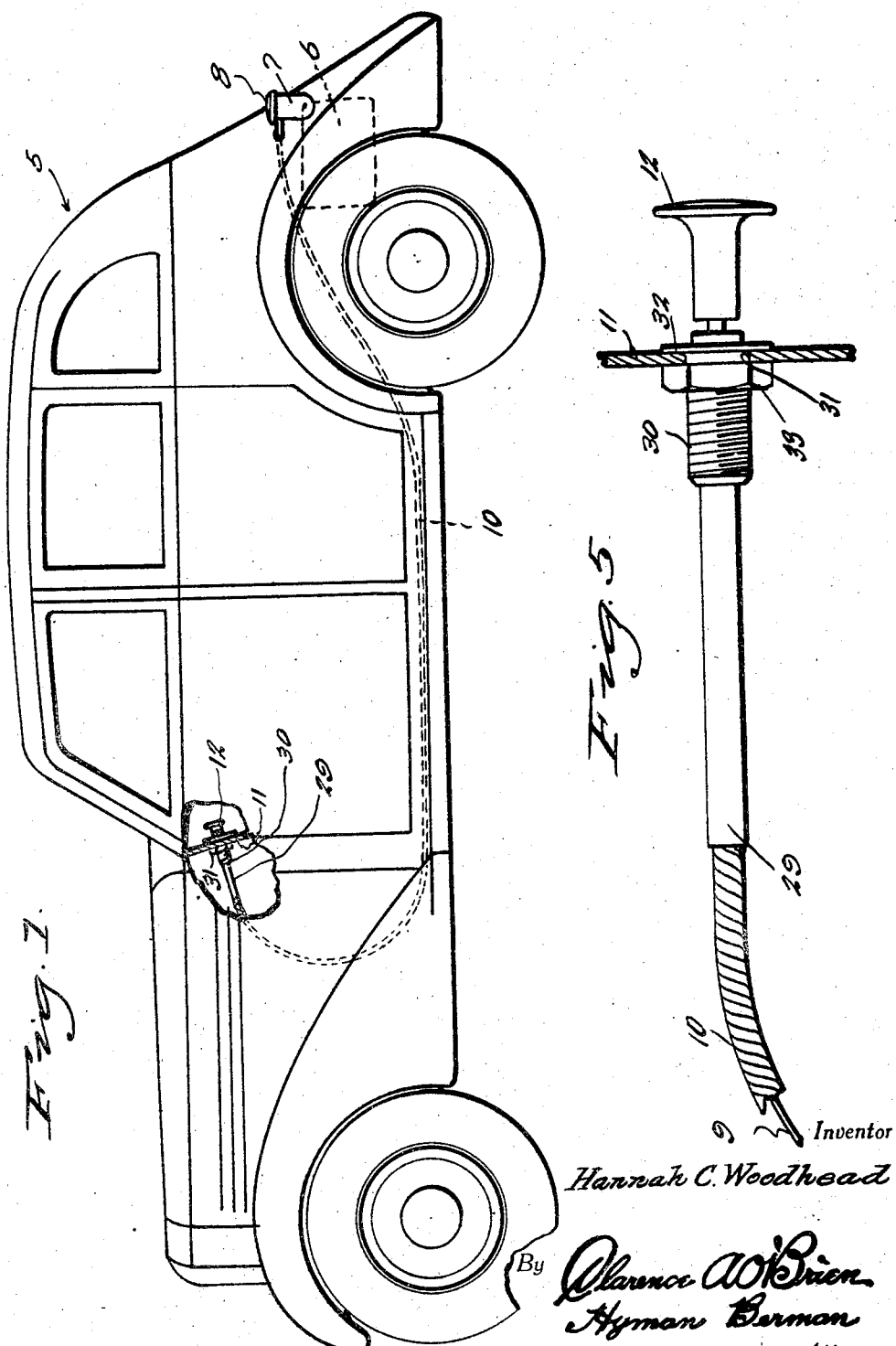

2,102,775

UNITED STATES PATENT OFFICE 2,102,775

AUTOMOBILE GAS TANK CAP LOCK

Hannah C. Woodhead, Darby, Pa.

Application January 19, 1937, Serial No. 121,341

2 Claims. (Cl. 220—55)

My invention relates generally to means for securing the cap of an automobile gasoline tank against unauthorized removal, and particularly to a mechanically operated arrangement of this character which is controllable from the driving compartment or other convenient place in the interior of the automobile, and an important object of my invention is to provide a simple, efficient, and low cost arrangement of the character indicated.

Other important objects of my invention will be apparent from a reading of the following description taken in connection with the drawings, wherein for purposes of illustration I have shown a preferred embodiment of my invention.

In the drawings:—

Figure 1 is a side elevational view of an automobile showing the filling cap in place on the filling neck of the automobile gas tank, and showing the control or operating button mounted on the instrument panel of the automobile, with dotted lines indicating a suitable arrangement of the operating cable.

Figure 2 is a transverse vertical sectional view taken through the filling neck, the filling cap, and showing the connection of the operating cable to the locking element.

Figure 3 is a top plan view of Figure 2 with the cap removed.

Figure 4 is a bottom plan view of the cap.

Figure 5 is a sectional elevational view showing the mounting of the control or operating knob on the instrument panel or other supporting member of the automobile.

Referring in detail to the drawings, the numeral 5 generally designates an enclosed type of automobile which has at one side of its rear the concealed gas tank 6 from which projects to the exterior of the automobile the filling neck 7 which is closed by a filling cap 8. An operating cable 9 extends through a suitable flexible conduit 10 to the instrument panel 11 or other supporting element in the interior of the automobile where the cable is operatively connected to the control or operating knob 12 which by reason of its location in the interior of the automobile is protected against tampering by unauthorized persons.

In accordance with the present invention a generally conventional filling neck 7 is altered to embody a spring arm 13 which is secured by suitable means to the interior of one side of the filling neck as indicated by the numeral 14 so that it will normally be in a vertical position and its upper part will stand away from the interior of the filling neck and engage against or close to the depending flange 15 on the upper end of the filling neck. Under this flange engage the opposed wings 16, 17 on the cap 8, which wings are passed to bear secure position under the flange 15 through notches 18, 19 formed in the flange 20 on the upper end of the filling neck from which the flange 15 depends. The wings are each provided at one side with a depending flange 21, 22, respectively, and adequate securing means 23 fastens the element carrying the wings securely to the depending cylindrical portion 24 of the cap.

The purpose of the provision of the depending flanges 21 and 22 on the respective wings 16 and 17 is to provide adequate strength and rigidity for these wings and also to provide cam means which act to force the spring arm 13 outwardly as the cap is being put in place so as to permit the passage of one end of the wing member through the notch 19. After the wing member has been pressed into place and turned to cause its ends to pass under the flange 15 the spring arm 13 will return to its normal position and thus limit turning movement of the wing member of the cap. The wings extend radially outwardly beyond the flange 15 when in position in the filling neck, to a sufficient extent to make a substantial engagement with the spring arm 13. The spring 13 being located as indicated in Figure 3 at the notch 19, positively prevents the filling cap from being rotated into a position in which the wings 16 and 17 could pass through the notches 18, 19 and release the cap for removal.

For retracting the spring arm 13 one end of the cable 9 is passed through an opening in the upper part of the arm 13 and turned over as indicated by the numeral 25. Supporting this connection of the cable with the arm 13 is the tube 26 which is secured to the side of the filling neck 7 around or in an opening in the wall of the filling neck, and this tube has a contracted part 27 which defines a shoulder against which works one end of the expanding helical spring 28 whose opposite end works against the outer side of the arm 13. By means of this arrangement the arm 13 is positively urged in a radially inward direction and into locking position relative to the wings 16, 17 on the cap. The contracted portion of the tube 26 snugly receives the conduit 10 as indicated in Figure 2 and the conduit 10 leads along a suitable route to a point in advance of the instrument panel or dashboard 11 whereat the front end of the cable is connected to a suitable operating knob 12.

A tube 29 of rigid character encases the front end of the conduit 10 as shown in Figure 5 and is mounted in an exteriorly threaded bushing 30 which is mounted through a receiving opening 31 in the instrument panel 11, and on the right hand side of the panel 11 the bushing has a stationary flange 32. A locking or clamping nut 33 is threaded on the bushing 30 to engage the back of the instrument panel in opposition to the flange 32 to make the mounting secure.

It is obvious that with the cap in place and in a lock position on the filling neck, the same cannot be rotated to a position to be released from the filling neck while the operating button 12 is in the normal pushed-in or indrawn position shown in Figure 5, since in this position the spring arm 13 is blocking the notch 14 in the flange of the filling neck. But when the handle 12 is pulled outwardly sufficiently to cause the cable 9 to overcome the tension of the spring 28 and that of the spring arm 13, so as to withdraw the spring arm 13 to a position radially outwardly of the wings 16, 17 on the cap, the cap may be rotated so as to bring the wings up through the notches 18 and 19, enabling complete removal of the cap.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

What is claimed is:—

1. An arrangement of the character described comprising a filling neck having a flange including opposed notches, a cap imposable on the upper end of said filling neck and provided with opposed wings adapted to pass downwardly through the notches and engage under the flange, and spring-pressed detent means located in one of said notches and mounted on the filling neck for blocking said notch to prevent withdrawal of one of the wings through said notch, cam means on the wings for moving the detent means partly out of the notch when the cap is being put on the neck and means for withdrawing said detent from normal operative locking position.

2. Means for locking a cap on a neck comprising a depending part on the cap provided with opposed wings, a flange surrounding the opening in the neck having opposed notches through which the wings pass as the cap is being placed on the neck, a turning movement of the cap placing the wings under the flange to lock the cap to the neck, a spring arm mounted in the neck and having its free end normally located in one of the said notches, a lateral tubular projection on the neck, a spring therein engaging a portion of the free end of the arm to press the same into the notch and an operating member extending through the tubular projection and connected with the spring arm for retracting the same.

HANNAH C. WOODHEAD.